United States Patent
Fit-Florea (10) Patent No.: US 8,775,494 B2
(45) Date of Patent: Jul. 8, 2014

(54) SYSTEM AND METHOD FOR TESTING WHETHER A RESULT IS CORRECTLY ROUNDED

(75) Inventor: Alexandru Fit-Florea, Belmont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 605 days.

(21) Appl. No.: 13/038,193

(22) Filed: Mar. 1, 2011

(65) Prior Publication Data

US 2012/0226730 A1  Sep. 6, 2012

(51) Int. Cl.
*G06F 7/38* (2006.01)

(52) U.S. Cl.
USPC .......................................................... 708/497

(58) Field of Classification Search
None
See application file for complete search history.

(56) References Cited

U.S. PATENT DOCUMENTS

| | | | |
|---|---|---|---|
| 6,219,685 B1 * | 4/2001 | Story | 708/498 |
| 6,560,623 B1 * | 5/2003 | Smith | 708/551 |
| 6,963,895 B1 | 11/2005 | Comstock | |
| 8,005,884 B2 * | 8/2011 | Fit-Florea et al. | 708/497 |
| 2009/0094308 A1 * | 4/2009 | Fit-Florea et al. | 708/497 |
| 2012/0226730 A1 * | 9/2012 | Fit-Florea | 708/500 |

FOREIGN PATENT DOCUMENTS

| | | |
|---|---|---|
| EP | 0377992 A2 | 1/1989 |
| GB | 2278940 A | 12/1994 |

\* cited by examiner

*Primary Examiner* — David H Malzahn (74) *Attorney, Agent, or Firm* — Patterson & Sheridan, LLP (57) ABSTRACT

A computer-implemented method for executing a floating-point calculation where an exact value of an associated result cannot be expressed as a floating-point value is disclosed. The method involves: generating an estimate of the associated result and storing the estimate in memory; calculating an amount of error for the estimate; determining whether the amount of error is less than or equal to a threshold of error for the associated result; and if the amount of error is less than or equal to the threshold of error, then concluding that the estimate of the associated result is a correctly rounded result of the floating-point calculation; or if the amount of error is greater than the threshold of error, then testing whether the floating-point calculation constitutes an exception case.

24 Claims, 5 Drawing Sheets

SYSTEM AND METHOD FOR TESTING WHETHER A RESULT IS CORRECTLY ROUNDED

BACKGROUND OF THE INVENTION

1. Field of the Invention

The present invention relates generally to computer systems for solving mathematical problems and, more specifically, to a system and method for testing whether a result is correctly rounded.

2. Description of the Related Art

A typical modern computer system includes one or more processor cores. Each core has a floating-point unit and/or may execute software to perform arithmetic operations, including floating-point addition, subtraction, multiplication, division, and square root. Processor cores implement a system of digits, typically binary or hexadecimal (base-16) to represent numbers. In these systems, some multiplicative inverse or division calculations, for example $3^{-1}$ or $\frac{1}{3}$, cannot be expressed exactly, as the exact result would contain an infinite number of bits or a greater number of bits than can be stored in a floating-point variable, e.g., $\frac{1}{3} = 0.333333 \ldots$ in decimal form or $0.010101 \ldots$ in binary form. These values therefore must be expressed as rounded to a certain limit of significance, such that the values can be expressed in a finite number of bits. The finite number of bits used by a processor core to represent a floating-point variable is referred to as the processor core's precision. A processor core may support more than one floating-point format. The accuracy of a floating-point value refers to how close the representation of a numeric value is to an infinitely precise representation. Skilled persons in the art are aware that, for modern processor cores, the standard for rounding multiplicative inverse, division, and square root calculations is set forth in IEEE Standard 754 for Binary Floating-Point Arithmetic developed by the Institute of Electrical and Electronics Engineers.

As is well-known, a floating-point number is represented as a sign (string of digits representing a plus or minus), a mantissa (string of digits representing the number without an exponent), and an exponent. The value of the floating-point number is determined by taking the product of the sign, the mantissa, and a base raised to the power of the value represented in the exponent field. The total space allocated for representing a floating-point number can be, for example 32 bits, for single precision, or 64 bits, for double precision.

One set of techniques known in the art for estimating the result of multiplicative inverse, division, and square root calculations involves convergence. Examples of a convergence techniques are the "long division" technique where one bit or one digit at a time is calculated, or Newton-Raphson techniques where a set of digits is calculated at a time. In other words, the technique requires that the processor estimates the next digits in the result only after the current digit has been determined. Convergence techniques are conventionally implemented for a worst case scenario optimization where the eventual convergence always guarantees that the "correct" result is obtained. In such an approach, the correct result, according to IEEE Standard 754, is oftentimes obtained as an "intermediate result" prior to the completion of the calculation. For example, one convergence technique calculates a result, y, of a multiplicative inverse problem, 1/b, by calculating three intermediate results $y_1$, $y_2$, and $y_3$, before arriving at the final result $y_4 = y$, which is guaranteed to be correct according to IEEE Standard 754. Each successive intermediate result is closer to the correct value than the previous result, i.e., $y_2$ is closer to the correct result than $y_1$.

However, oftentimes, the correct result may be reached in fewer than four steps, i.e., $y_3 = y_4 = y$. In this case, $y_4$ would still be calculated from $y_3$, as there is no guarantee that $y_3$ is the correctly rounded result. As is well-known, exceptions are raised when a result of a calculation is positive or negative infinity or not a number (NAN). In conventional processors, a determination as to whether an exception would be raised is made early in the calculation process so as to avoid making a calculation the result of which cannot be expressed as a floating-point number. If an exception would be raised, then an exception handler is invoked.

One drawback of such an approach is that processor cores implementing the convergence method for multiplicative inverse, division, and square root calculations often waste processing time and resources on unnecessary calculations. For example, processing time and resources are wasted if an intermediate result, which is being refined by the convergence method, is already equal to the correct result according to IEEE Standard 754. Another drawback of such an approach is that processing time and resources are wasted to determine whether a calculation raises an exception, where such exceptions occur relatively infrequently.

As the foregoing illustrates, what is needed in the art is a more efficient technique for determining whether the result of such computations conforms to conventional IEEE floating-point standards.

SUMMARY OF THE INVENTION

Embodiments provide a computer-implemented method, computer-readable medium or system for executing a floating-point calculation where an exact value of an associated result cannot be expressed as a floating-point value. The technique involves: generating an estimate of the associated result and storing the estimate in memory; calculating an amount of error for the estimate; determining whether the amount of error is less than or equal to the threshold of error for the associated result; and if the amount of error is less than or equal to the threshold of error, then concluding that the estimate of the associated result is a correctly rounded result of the floating-point calculation; or if the amount of error is greater than the threshold of error, then testing whether the floating-point calculation constitutes an exception case.

Embodiments provide a more efficient technique for determining whether the result of computations including multiplicative inverse, square root, and division conforms to conventional IEEE floating-point standards.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
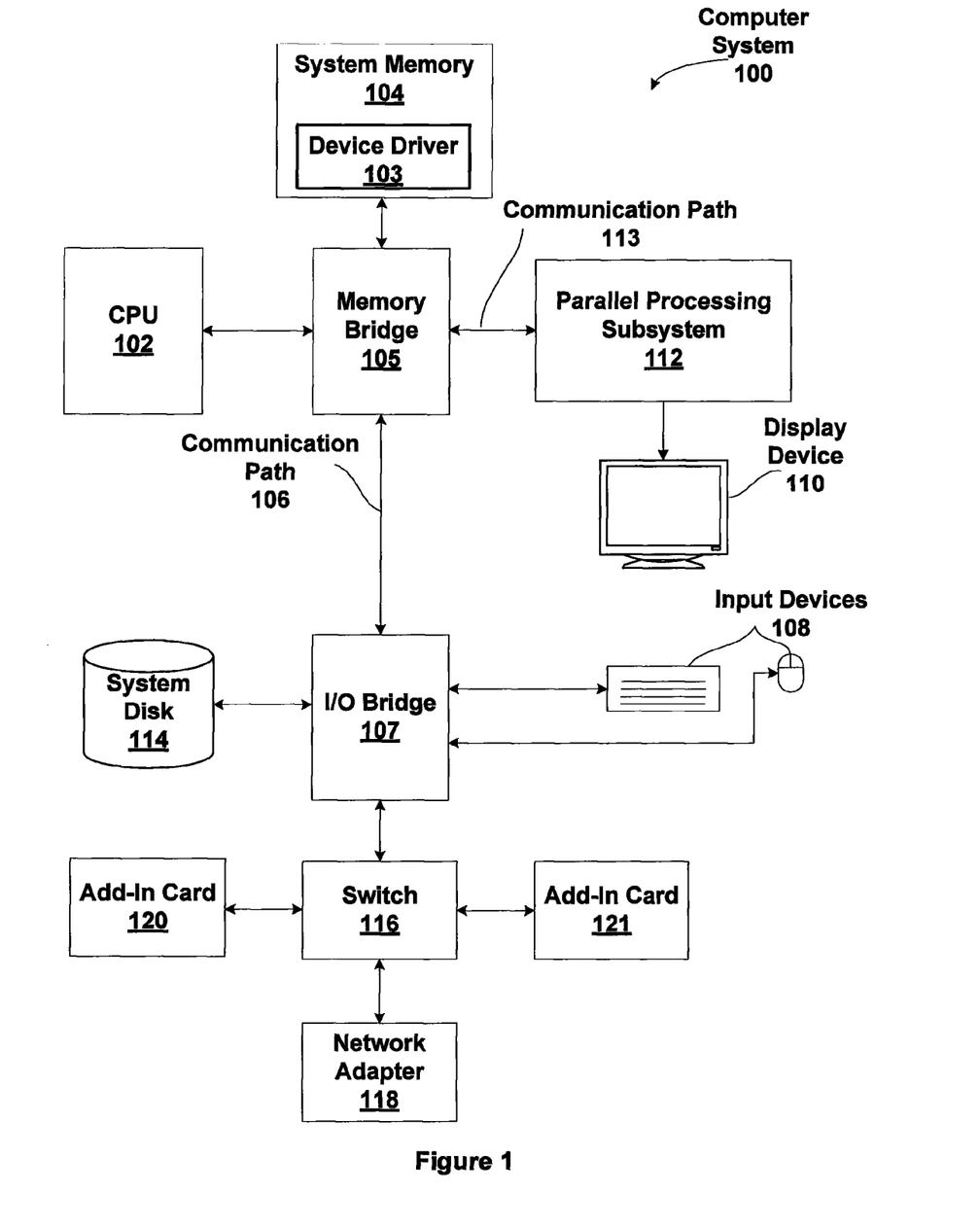
FIG. 1 illustrates a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It would be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
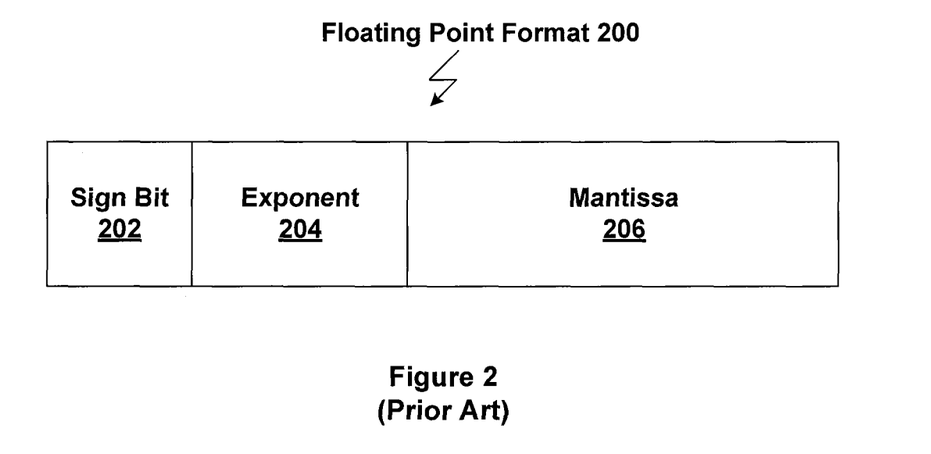
FIG. 2 illustrates a conventional data structure used to represent a floating-point number.

FIG. 2 illustrates a conventional format of a floating-point number 200. As shown, the floating-point number 200 includes a sign bit 202, an exponent 204, and a mantissa 206. In one implementation, the sign 202 is stored in one bit, with 0 representing positive numbers and 1 representing negative numbers. In other implementations, the exponent 204 and the mantissa 206 may each be several bits long. Various bit lengths for floating-point components, as specified by IEEE Standard 754, are set forth below in Table 1. However, those skilled in the art would recognize that other floating point representations and other bit lengths are possible, and that all such representations are within the scope of the present invention.

TABLE 1

| Type | Sign Bit | Exponent Bits | Mantissa Bits | Total Bits |
| --- | --- | --- | --- | --- |
| Half-Precision | 1 | 5 | 10 | 16 |
| Single-Precision | 1 | 8 | 23 | 32 |
| Double-Precision | 1 | 11 | 52 | 64 |
| Quad-Precision | 1 | 15 | 112 | 128 |

As is well-known, in many conventional implementations, the value of a floating-point number is equal to −1 raised to the power of the sign bit, multiplied by 2 raised to the value represented in the exponent field, multiplied by the mantissa, where the sign bit, the exponent, and the mantissa are all binary numbers. In other words, floating-point value=$(-1)^{Sign} * 2^{Exponent} * Mantissa$. The floating-point format provides specialized representations for the value zero, positive infinity, negative infinity, and NAN (not a number) data.

Figure 3:
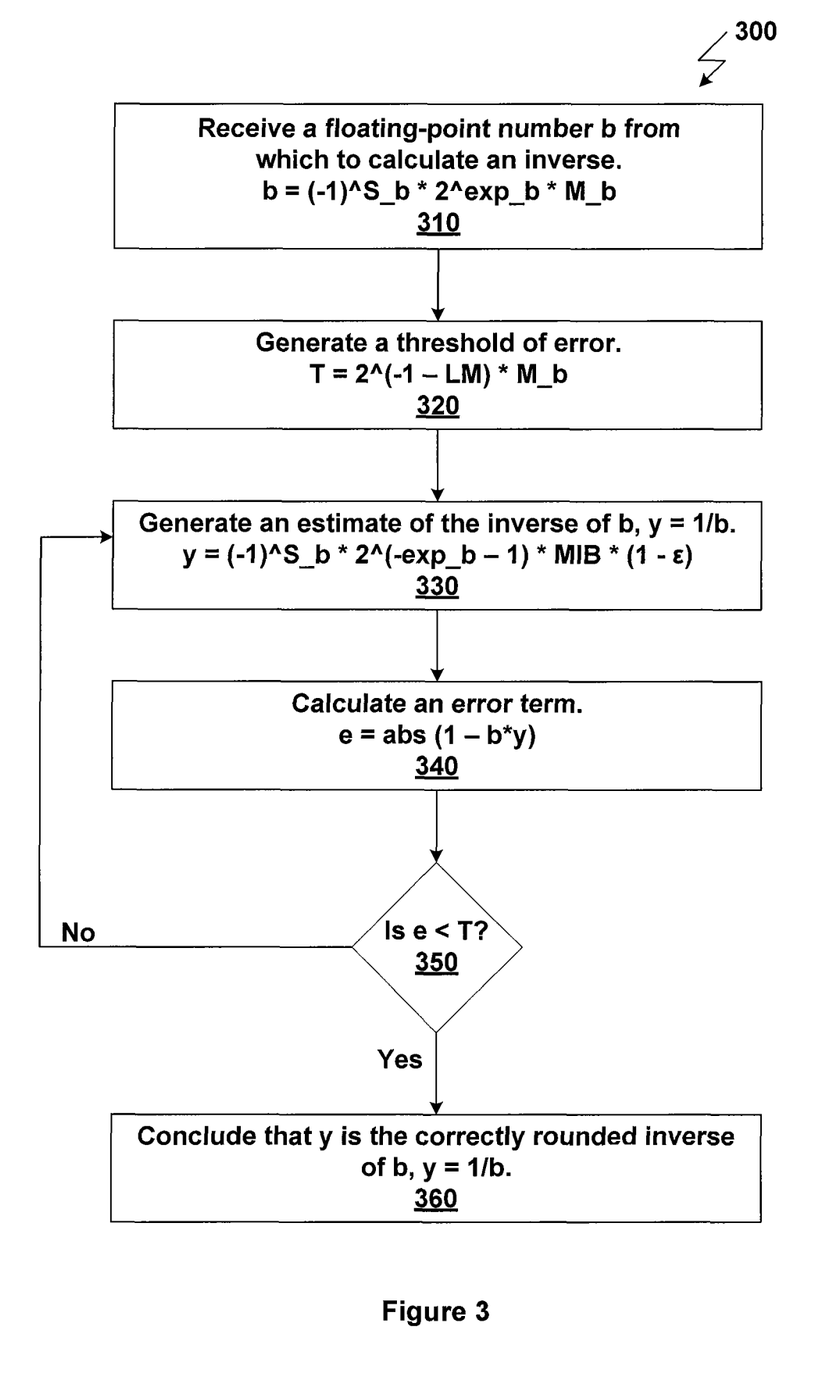
FIG. 3 is a flow diagram of method steps for calculating an inverse of a floating-point number, according to one embodiment of the present invention.

FIG. 3 is a flow diagram of method steps for calculating an inverse of a floating-point number, according to one embodiment of the present invention. Although the method steps are discussed in conjunction with FIGS. 1-2, persons skilled in the art would understand that any system configured to perform the method steps, in any order, falls within the scope of the present invention.

As shown, the method 300 begins at step 310, where the processor core receives a floating-point number b from which to calculate a multiplicative inverse. As persons skilled in the art would appreciate, the processor core could be located in CPU 102, in parallel processing subsystem 112, or in any part of the computer system 100 that is capable of processing data and performing floating-point operations. As set forth above in FIG. 2, the floating-point value b is equal to −1 raised to the power of the sign bit of b, multiplied by 2 raised to the power of the exponent of b, multiplied by the mantissa of b. Represented in equation form, $b=(-1)^{S\_b} * 2^{exp\_b} * M\_b$, where $S\_b$ is the sign bit of b, $exp\_b$ is the exponent of b, and $M\_b$ is the mantissa of b.

At step 320, the processor core calculates a threshold of error. In one embodiment, the threshold of error T is equal to $2^{(-2-LM)} * M\_b$, where LM is the length of the mantissa or the number of bits in the mantissa. For example, as illustrated in Table 1, for a double-precision floating-point number LM=52.

At step 330, the processor core generates an estimate of 1/b, the inverse of b, defined as y. Persons skilled in the art would understand that 1/b can be represented as follows: $y=(-1)^{S\_b} * 2^{(-exp\_b-1)} * MIB * (1-\epsilon)$, where MIB is the mantissa of the inverse of b, and $\epsilon$ is a measure of error. Approaches for generating an estimate of MIB include many known techniques. Convergence techniques, such as long division, have a characteristic that the result is obtained over several steps, where each successive step "converges," or comes closer to the ultimate result of the calculation, than the previous step. Sometimes, the exact result is reached after a certain number of steps. At other times, the exact result cannot be reached (for example, because the exact result cannot be expressed in binary or decimal notation) and the calculation must be terminated instead when the correctly rounded result, according to IEEE Standard 754, is reached.

At step 340, the processor core calculates an error term for the estimate of the inverse of b. In one embodiment, the error is defined as the difference between 1 and the product of b and y, e=1−b*y. Those skilled in the art would realize that, if y were equal to 1/b, then the error term would be zero. Those skilled in the art would also recognize that the value of e could be calculated using a single multiply-add operation, which is performed very quickly by most modern processor cores.

At step 350, the processor core determines whether the error term, in absolute value, is less than the threshold of error—in other words, whether e<T. If e<T, then the method 300 proceeds to step 360, where the processor core concludes that y, which is the estimate of the inverse of b, is the correct inverse according to IEEE standard 754. In one embodiment, y is then provided as the result of the calculation.

If, however, at step 350, the method 300 determines that e>T, then the processor core concludes either that y needs to be further refined or that the calculation constitutes an exception case. As is well-known, a calculation constitutes an exception case if a result of the calculation is positive or negative infinity or not a number (NAN). In such case, the method 300 determines whether the calculation raises an exception at step 370. If so, then the method 300 invokes the exception handler at step 380. If not, the method 300 may return to step 330, where the processor core generates a new estimate of 1/b. Alternatively, the processor core may use a different method to generate a new estimate of 1/b. Again, the new estimate of 1/b may be calculated based on the previous estimate using any known convergence technique.

Figure 4:
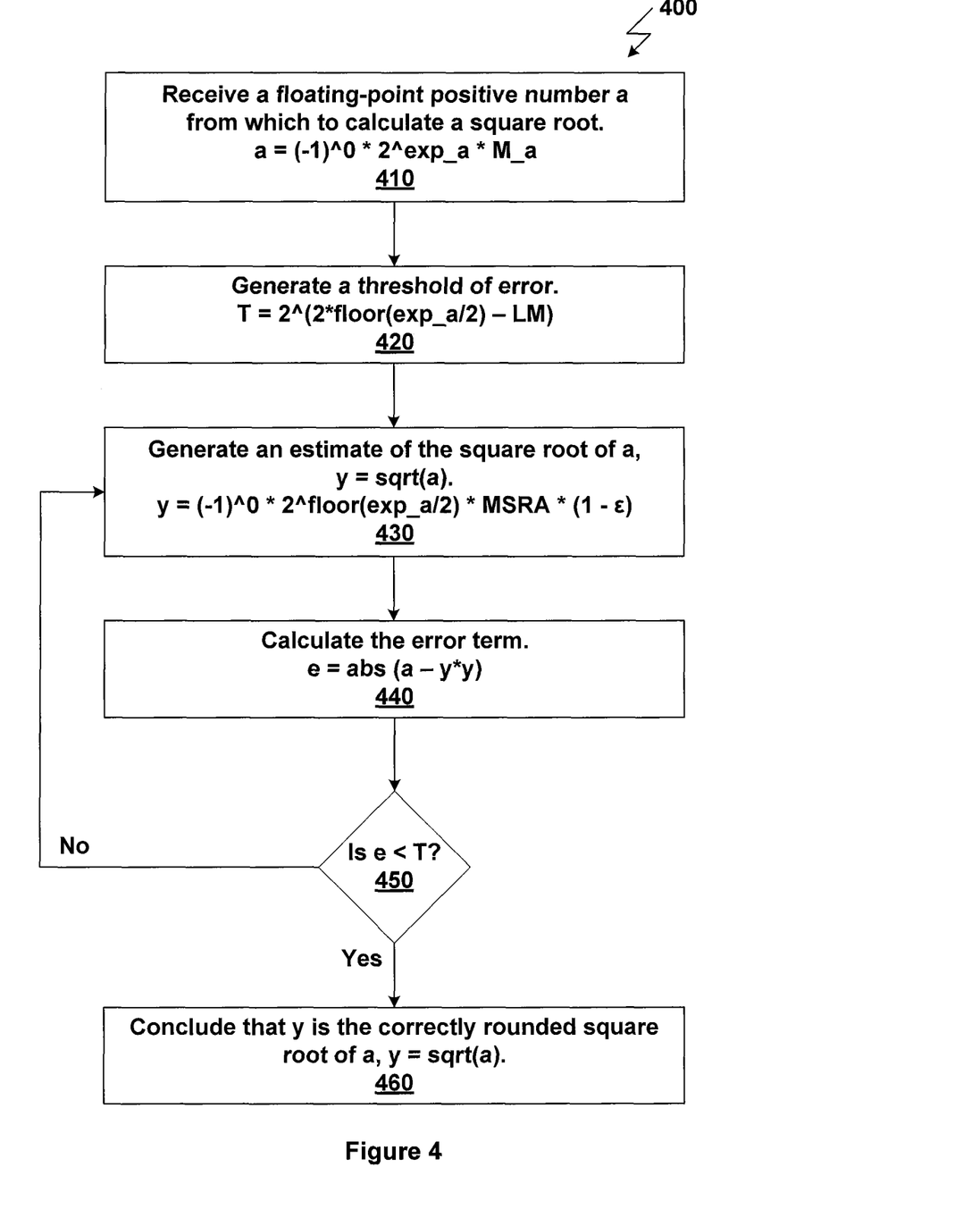
FIG. 4 is a flow diagram of method steps for calculating a square root of a floating-point number, according to one embodiment of the present invention.

FIG. 4 is a flow diagram of method steps for calculating a square root of a floating-point number, according to one embodiment of the present invention. Although the method steps are discussed in conjunction with FIGS. 1-2, persons skilled in the art would understand that any system configured to perform the method steps, in any order, falls within the scope of the present invention.

As shown, the method 400 begins at step 410, where the processor core receives a positive floating-point number a from which to calculate a square root. As persons skilled in the art would appreciate, the processor core could be located in CPU 102, in parallel processing subsystem 112, or in any part of the computer system 100 that is capable of processing data and performing floating-point operations. As set forth above in FIG. 2, the floating-point value a is equal to −1 raised to the power of the sign bit of a, multiplied by 2 raised to the power of the exponent of a, multiplied by the mantissa of a. Represented in equation form, a=*2^exp_a*M_a, where 0 is the sign bit of a (a is a positive number), exp_a is the exponent of a, and M_a is the mantissa of a.

At step 420, the processor core calculates a threshold of error. In one embodiment, the threshold of error T is equal to 2^(exp_a−LM)*M_a, where LM is the length of the mantissa or the number of bits in the mantissa. For example, as illustrated in Table 1, for a double-precision floating-point number LM=52.

At step 430, the processor core generates an estimate, y, of the square root of a, sqrt (a). Persons skilled in the art would understand that sqrt(a) can be represented as follows: y=(−1)^0*2^floor(exp_a/2)*MSRA*(1−$\epsilon$), where MSRA is the mantissa of the square root of a, and $\epsilon$ is a measure of error. Approaches for generating an estimate of MSRA include many known convergence and polynomial techniques.

At step 440, the processor core calculates an error term for the estimate of the square root of a. In one embodiment, the error is defined as the difference between a and the square of y, e=a−y*y. Those skilled in the art would realize that, if y were equal to sqrt(a), then the error term would be zero. Those skilled in the art would also recognize that the value of e could be calculated using a single multiply-add operation, which is performed very quickly by most modern processor cores.

At step 450, the processor core determines whether the error term in absolute value is less than the threshold of error—in other words, whether e<T. If e<T, then the method 400 proceeds to step 460, where the processor core concludes that y, which is the estimate of the square root of a, is the correct square root according to IEEE standard 754. In one embodiment, y is then provided as the result of the calculation.

If, however, at step 450, the method 400 determines that e>T, then the processor core concludes either that y needs to be further refined or that the calculation is an exception case. As is well-known, a calculation is an exception case if a result of a calculation is positive or negative infinity or not a number (NAN). In such case, the method 400 determines whether the calculation raises an exception at step 470. If so, then the method 400 invokes the exception handler at step 480. If not, the method 400 may return to step 430, where the processor core generates a new estimate of sqrt (a). Alternatively, the processor core may use a different method to generate a new estimate of sqrt (a). Again, the new estimate of sqrt (a) may be calculated based on the previous estimate using any known convergence technique.

Figure 5:
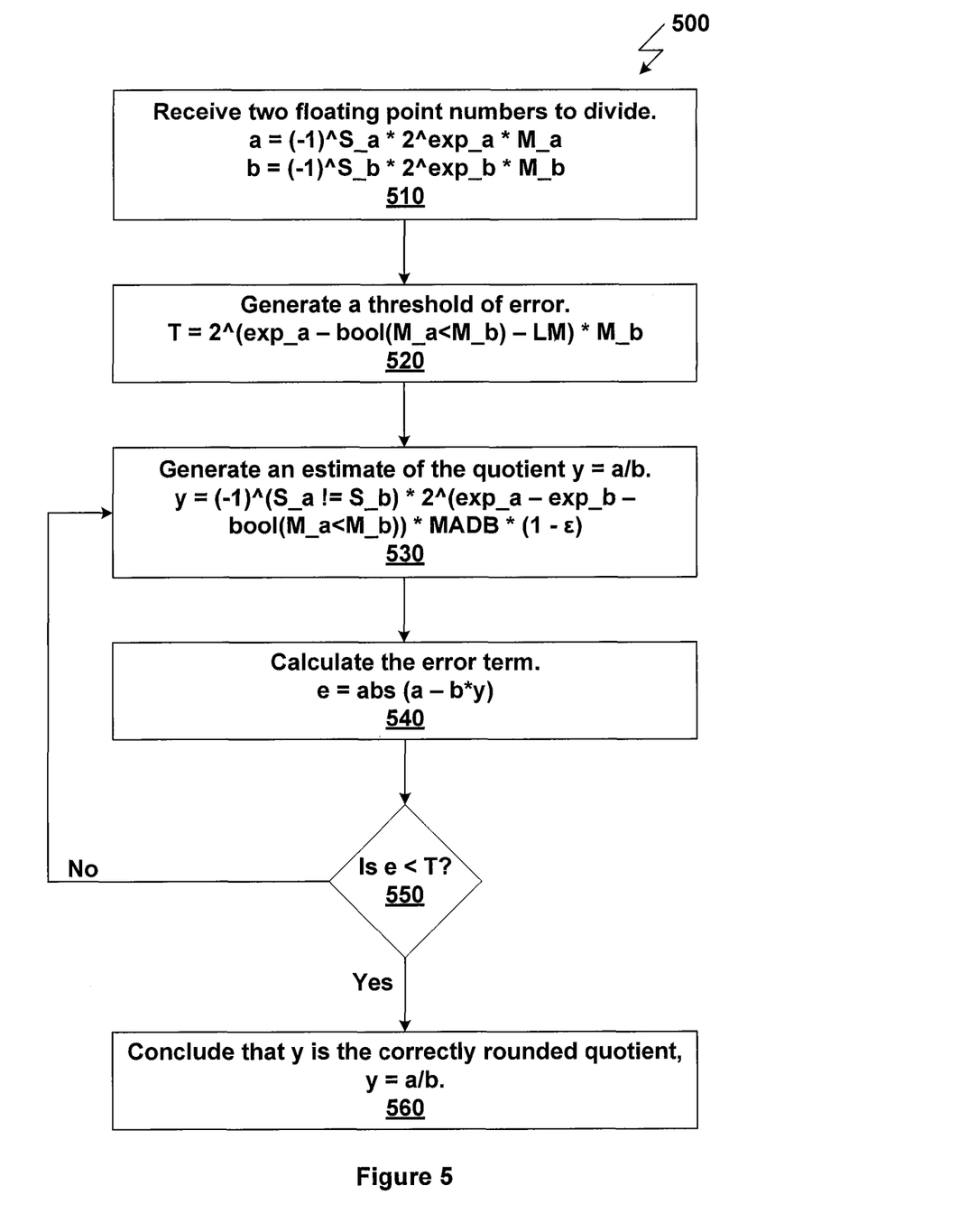
FIG. 5 is a flow diagram of method steps for calculating a quotient of two floating-point numbers, according to one embodiment of the present invention.

FIG. 5 is a flow diagram of method steps for dividing two floating-point numbers, according to one embodiment of the present invention. Although the method steps are discussed in conjunction with FIGS. 1-2, persons skilled in the art would understand that any system configured to perform the method steps, in any order, falls within the scope of the present invention.

As shown, the method 500 begins at step 510, where the processor core receives two floating-point numbers to divide, a and b. As persons skilled in the art would appreciate, the processor core could be located in CPU 102, in parallel processing subsystem 112, or in any part of the computer system 100 that is capable of processing data and performing floating-point operations. As set forth above in FIG. 2, the floating-point value a is equal to −1 raised to the power of the sign bit of a, multiplied by 2 raised to the power of the exponent of a, multiplied by the mantissa of a. Represented in equation form, a=(−1)^S_a*2^exp_a*M_a, where S_a is the sign bit of a, exp_a is the exponent of a, and M_a is the mantissa of a. The floating-point value b could be similarly represented as b=(−1)^S_b*2^exp_b*M_b, where S_b is the sign bit of b, exp_b is the exponent of b, and M_b is the mantissa of b.

At step 520, the processor core calculates a threshold of error. In one embodiment, the threshold of error T is equal to 2^(exp_a−bool(M_a<M_b)−LM), where LM is the length of the mantissa or the number of bits in the mantissa. For example, as illustrated in Table 1, for a double-precision floating-point number LM=52. As is well-known, the function bool, returns 1 if the input value is true, and 0 if the input value is false.

At step 530, the processor core generates an estimate y of the quotient of a and b, a/b. Persons skilled in the art would understand that a/b can be represented as follows: $y=a/b=(-1)^{\wedge}(S\_a!=S\_b)*2^{\wedge}(exp\_a-exp\_b-bool(M\_a<M\_b))*MADB*(1-\epsilon)$, where MADB is the mantissa of the quotient of a and b, and $\epsilon$ is a measure of error. Approaches for generating an estimate of MADB include many known convergence techniques. As is well-known, the comparison !=("not equal") returns true or 1 if the two values provided to the comparison are not equal, and false or 0 if the two values provided to the comparison are equal. For example, 1!=1 returns false or 0.

At step 540, the processor core calculates an error term for the estimate of the quotient of a and b. In one embodiment, the error is defined as the difference between a and the product of b and y, e=a−b*y. Those skilled in the art would realize that, if y were equal to a/b, then the error term would be zero. Those skilled in the art would also recognize that the value of e could be calculated using a single multiply-add operation, which is performed very quickly by most modern processor cores.

At step 550, the processor core determines whether the error term in absolute value is less than the threshold of error—in other words, whether e<T. If e<T, then the method 500 proceeds to step 560, where the processor core concludes that y, which is the estimate of the quotient of a and b, is the correct quotient according to IEEE standard 754. In one embodiment, y is then provided as the result of the calculation.

If, however, at step 550, the method 500 determines that e>T, then the processor core concludes either that y needs to be further refined or that the calculation is an exception case. As is well-known, a calculation is an exception case if a result of the calculation is positive or negative infinity or not a number (NAN). In such case, the method 500 determines whether the calculation raises an exception at step 570. If so, then the method 500 invokes the exception handler at step 580. If not, the method 500 may return to step 530, where the processor core generates a new estimate of a/b. Alternatively, the processor core may use a different method to generate a new estimate of a/b. Again, the new estimate of a/b may be calculated based on the previous estimate using any known convergence technique.

If, however, at step 550, the method 500 determines that e>T, then the processor core concludes that y needs to be further refined. In such case, the method 500 may return to step 530, where the processor core generates a new estimate of a/b. Again, the new estimate of a/b may be calculated based on the previous estimate using any known technique or using a different technique that does not require the previous estimate.

Below, a derivation of the technique illustrated in FIG. 3 is demonstrated to further explain how embodiments of the present invention are enabled. While the discussion below is focused only on FIGS. 2 and 3, those skilled in the art would appreciate that the techniques illustrated in FIGS. 4 and 5 can be derived in a similar manner.

As discussed above in relation to FIG. 2, a floating-point number b 200 is represented in terms of a sign bit S_b 202, an exponent exp_b 204, and a mantissa M_b 206. The floating-point number b can be expressed as $b=(-1)^{\wedge}S\_b*2^{\wedge}exp\_b*M\_b$. The multiplicative inverse of b, y=1/b, is similarly represented in terms of a sign bit S_y, an exponent exp_y, a mantissa M_y, and an error factor $(1-\epsilon)$. Those skilled in the art would realize that S_y=S_b. For example, if b is a positive number, then the multiplicative inverse of b is also a positive number. Using similar reasoning, exp_y=−exp_b−1. For example, if b is between 4 and 8, and therefore has an exponent of 2 in binary, then the multiplicative inverse of b is between ⅛ and ¼, having an exponent of −3 in binary. Based on this information, one skilled in the art would conclude that the only value that remains to be determined is the mantissa of y, M_y, which is a value between 1 and 2. In short, y can be represented as $y=(-1)^{\wedge}S\_b*2^{\wedge}(-exp\_b-1)*M\_y*(1-\epsilon)$, where $\epsilon$ is a measure of error. The mantissa of y is represented with LM bits, where LM is the length of the mantissa. For example, if y is a double-precision floating-point number, then LM=52 bits. In order for the value of y to be the correctly rounded inverse of b according to IEEE Standard 754, all LM bits of M_y must be correct. The maximum possible threshold of error for round-to-nearest rounding mode, therefore, is half of the base raised to the power of the position corresponding to the last bit in the mantissa, or half unit in the last place (ulp). If the base is 2, then the maximum possible threshold is half of two raised to the power of the position corresponding to the last bit of the mantissa, which is equal to two raised to the power of one less than the position corresponding to the last bit of the mantissa.

As set forth above, the first bit of the mantissa represents the power of $2^{\wedge}(-exp\_b-1)$. The last bit of the mantissa, therefore, represents the power of $2^{\wedge}(-exp\_b-1-LM+1)=2^{\wedge}(-exp\_b-LM)$. The maximum possible threshold of error for y is half of this value:

$$T\_y = \tfrac{1}{2} * 2^{\wedge}(-exp\_b-LM) \quad (1)$$

$$T\_y = 2^{\wedge}(-exp\_b-1-LM) \quad (2)$$

Those skilled in the art would recognize that equation (2) is equivalent to equation (1), but rewritten in different form.

The error term e can then be calculated as e=1−b*y or the difference of 1 and the product of b and the estimate of the inverse of b. As is well-known, if y=1/b, then e=1−b*y=1−b*(1/b)=0. The equation for the error term is presented as equation (3) below.

$$e = \text{abs}(1-b*y) \quad (3)$$

Those skilled in the art would recognize that if y is within the threshold of error for y, i.e., 1/b−T_y<y<1/b+T_y, then e is less than the absolute value of b*T_y. The mathematical reasoning for this is as follows:

$$e = \text{abs}(1-b*y) \quad (3)$$

$$T = e\_\text{max} = \text{abs}(1-b*(1/b \pm T\_y)) \quad (4)$$

$$T = \text{abs}(1-1 \pm b*T\_y) \quad (5)$$

$$T = \text{abs}(b*T\_y) \quad (6)$$

$$T = 2^{\wedge}exp\_b * M\_b * 2^{\wedge}(-exp\_b-1-LM) \quad (7)$$

$$T = 2^{\wedge}(-1-LM) * M\_b \quad (8)$$

Those skilled in the art would understand that the value of T derived in equation (8) above is equal to the value of T provided in step 320 of FIG. 3. If the absolute value of the error term e, as provided in equation (3), is less than T, then the value y is the correctly rounded multiplicative inverse of b.

Those skilled in the art would recognize that the floating point arithmetic leading to the calculation of e can be perform in such a way that inputs which may include but are not limited to not-a-number (NaN) data, positive and negative infinites, and subnormals may generate a value of e such that the absolute value of e is larger than the threshold.

In sum, the technique disclosed above provides a more efficient way to determine whether an intermediate result of a calculation is correctly rounded according to IEEE Standard 754. More specifically, the technique applies to a multiplicative inverse, division, square root or other similar mathematical computation where the result cannot be expressed exactly using floating-point binary numbers of fixed length. To implement the technique, a processor core first calculates an intermediate result for the calculation at issue and then estimates an error term associated with the intermediate result. In one embodiment, the error term may be calculated using a multiply-add instruction. Next, the processor core generates a threshold of error, which, in one embodiment, is equal to mantissa of the input multiplied with two raised to the power of the exponent of the input less the length of the mantissa of the input. The processor core then compares the error term with the threshold of error to determine whether the intermediate result is correctly rounded. If the error term is less than the threshold of error, then the processor core concludes that the intermediate result is the correctly rounded result according to IEEE Standard 754. However, if the error term is greater than the threshold of error, then the processor core concludes that the intermediate result is not the correctly rounded result according to IEEE Standard 754 and generates a new intermediate result for further refinement of the overall calculation.

One advantage of the disclosed approach is that a processor core can determine whether an intermediate result of a floating-point calculation is correctly rounded under IEEE floating-point standards. As a result, processing time and resources which, according to prior approaches, would have been spent attempting to further refine an intermediate result that is already correctly rounded, can be saved.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The scope of the present invention is determined by the claims that follow.

What is claimed is:

1. A computer-implemented method for executing a floating-point calculation where an exact value of an associated result cannot be expressed as a floating-point value, the method comprising:
    generating an estimate of the associated result and storing the estimate in memory;
    calculating an amount of error for the estimate;
    calculating, via a floating point unit, a threshold of error for the associated result, wherein the threshold of error is based on 2 raised to a power of a value derived in part from a mantissa of a first floating-point number used in the floating point calculation;
    determining whether the amount of error is less than or equal to the threshold of error for the associated result; and
    if the amount of error is less than or equal to a threshold of error for the associated result, then concluding that the estimate of the associated result is a correctly rounded result of the floating-point calculation; or
    if the amount of error is greater than the threshold of error, then testing whether the floating-point calculation constitutes an exception case.

2. The method of claim 1, wherein the floating-point calculation comprises a multiplicative inverse calculation of the first floating-point number.

3. The method of claim 2, wherein the threshold of error is less than or equal to the product of:
    2 raised to the power of −1 less a number of bits in the mantissa of the first floating-point number, and
    the mantissa of the first floating-point number.

4. The method of claim 1, wherein the floating-point calculation comprises a square root calculation of the first floating-point number.

5. The method of claim 4, wherein the value is equal to 2 multiplied by a floor of half an exponent of the first floating point number less a number of bits in the mantissa of the first floating-point number, and the threshold error is less than or equal to 2 raised to the power of the value.

6. The method of claim 1, wherein the floating-point calculation comprises a division calculation of the first floating-point number divided by a second floating-point number.

7. The method of claim 6, wherein:
    the value is equal to an exponent of the first floating-point number, less a boolean function of a mantissa of the first floating-point number is less than or equal to a mantissa of a second floating-point number, less a number of bits in the mantissa of the first floating-point number, and
    the threshold of error is less than or equal to the product of 2 raised to the power of the value and the mantissa of the second floating-point number.

8. The method of claim 1, wherein a processing time required for the step of calculating an amount of error for the associated result is less than a processing time required generating an estimate of the associated result.

9. The method of claim 8, wherein the step of calculating an amount of error for the associated result comprises performing only one or more of addition operations, multiplication operations, and bit manipulation operations.

10. The method of claim 1, further comprising:
    determining that the floating-point calculation constitutes an exception case; and
    invoking an exception handler.

11. The method of claim 1, further comprising:
    determining that the floating-point calculation does not constitute an exception case; and
    generating a new estimate of the associated result for purposes of calculating a new amount of error for the new estimate and comparing the new amount of error to the threshold of error.

12. A non-transitory computer-readable medium storing instructions that, when executed by a processing unit, cause the processing unit to perform a floating-point calculation where an exact value of an associated result cannot be expressed as a floating-point value, by performing the steps of:
    generating an estimate of an associated result for a floating-point calculation;

calculating an amount of error for the estimate;
calculating a threshold of error for the associated result, wherein the threshold of error is based on 2 raised to a power of a value derived in part from a mantissa of a first floating-point number used in the floating point calculation;
determining whether the amount of error is less than or equal to a the threshold of error for the associated result; and
if the amount of error is less than or equal to a threshold of error for the associated result, then concluding that the estimate of the associated result is a correctly rounded result of the floating-point calculation; or
if the amount of error is greater than the threshold of error, then testing whether the floating-point calculation constitutes an exception case.

13. The computer-readable medium of claim 12, wherein the floating-point calculation comprises a multiplicative inverse calculation of the first floating-point number.

14. The computer-readable medium of claim 13, wherein the threshold of error is less than or equal to the product of:
2 raised to the power of −1 less a number of bits in the mantissa of the first floating-point number, and
the mantissa of the first floating-point number.

15. The computer-readable medium of claim 13, wherein the floating-point calculation comprises a square root calculation of the first floating-point number.

16. The computer-readable medium of claim 15, wherein the value is equal to 2 multiplied by a floor of half an exponent of the first floating point number less a number of bits in the mantissa of the first floating-point number, and the threshold error is less than or equal to 2 raised to the power of the value.

17. The computer-readable medium of claim 12, wherein the floating-point calculation comprises a division calculation of the first floating-point number divided by a second floating-point number.

18. The computer-readable medium of claim 17, wherein:
the value is equal to an exponent of the first floating-point number, less a boolean function of a mantissa of the first floating-point number is less than or equal to a mantissa of a second floating-point number, less a number of bits in the mantissa of the first floating-point number, and
the threshold of error is less than or equal to the product of 2 raised to the power of the value and the mantissa of the second floating-point number.

19. The computer-readable medium of claim 12, wherein a processing time required for the step of calculating an amount of error for the associated result is less than a processing time required generating an estimate of the associated result.

20. The computer-readable medium of claim 19, wherein the step of calculating an amount of error for the result comprises performing only one or more of addition operations, multiplication operations, and bit manipulation operations.

21. The computer-readable medium of claim 12, wherein the instructions further comprise the steps of:
determining that the floating-point calculation constitutes an exception case; and
invoking an exception handler.

22. The computer-readable medium of claim 12, wherein the instructions further comprise the steps of:
determining that the floating-point calculation does not constitute an exception case; and
generating a new estimate of the associated result for purposes of calculating a new amount of error for the new estimate and comparing the new amount of error to the threshold of error.

23. A computing device, comprising:
a processing unit, including a floating point unit and configured to:
generate an estimate of an associated result for a floating-point calculation;
calculate an amount of error for the estimate;
calculate, via the floating point unit, a threshold of error for the associated result, wherein the threshold of error is based on 2 raised to a power of a value derived in part from a mantissa of a first floating-point number used in the floating point calculation;
determine whether the amount of error is less than or equal to a the threshold of error for the associated result; and
if the amount of error is less than or equal to a threshold of error for the associated result, then conclude that the estimate of the associated result is a correctly rounded result of the floating-point calculation; or
if the amount of error is greater than the threshold of error, then test whether the floating-point calculation constitutes an exception case.

24. The computing device of claim 23, further comprising a memory coupled to the processing unit that includes instructions that, when executed by the processing unit, cause the processing unit to perform the steps of:
generating an estimate of the associated result;
calculating an amount of error for the estimate;
calculating a threshold of error for the associated result based on a mantissa of a first floating-point number used in the floating point calculation;
determining whether the amount of error is less than or equal to a threshold of error for the associated result; and
if the amount of error is less than or equal to a threshold of error for the associated result, then concluding that the estimate of the associated result is a correctly rounded result of the floating-point calculation; or
if the amount of error is greater than the threshold of error, then testing whether the floating-point calculation constitutes an exception case.

* * * * *

UNITED STATES PATENT AND TRADEMARK OFFICE
CERTIFICATE OF CORRECTION

PATENT NO. : 8,775,494 B2  
APPLICATION NO. : 13/038193  
DATED : July 8, 2014  
INVENTOR(S) : Fit-Florea Page 1 of 1

It is certified that error appears in the above-identified patent and that said Letters Patent is hereby corrected as shown below:

In the Claims:

Column 11, Claim 12, Line 8, please delete "a";  
Column 12, Claim 23, Line 26, please delete "a".

Signed and Sealed this  
Fourth Day of November, 2014

Michelle K. Lee  
*Deputy Director of the United States Patent and Trademark Office*